US012323373B2

(12) United States Patent
Goldshtein et al.

(10) Patent No.: US 12,323,373 B2
(45) Date of Patent: Jun. 3, 2025

(54) SIMULATION OF AUTOMATED TELEPHONE CALL(S)

(71) Applicant: GOOGLE LLC, Mountain View, CA (US)

(72) Inventors: Sasha Goldshtein, Tel Aviv (IL); Yoav Tzur, Tel Aviv (IL); Adva Wolf, Tel Aviv (IL)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/385,692

(22) Filed: Oct. 31, 2023

(65) Prior Publication Data

US 2025/0133036 A1    Apr. 24, 2025

Related U.S. Application Data

(60) Provisional application No. 63/544,975, filed on Oct. 20, 2023.

(51) Int. Cl.
*H04L 51/02* (2022.01)
*G06F 40/205* (2020.01)
*G06F 40/30* (2020.01)

(52) U.S. Cl.
CPC ............ *H04L 51/02* (2013.01); *G06F 40/205* (2020.01); *G06F 40/30* (2020.01)

(58) Field of Classification Search
CPC ...... G06F 40/205; G06F 40/30; G06F 40/216; G06F 16/248; G06F 16/9535;
(Continued)

(56) References Cited

U.S. PATENT DOCUMENTS 8,226,477 B1   7/2012  Machado
11,438,283 B1*  9/2022  White ................... G06F 40/216
(Continued)

FOREIGN PATENT DOCUMENTS

KR    20040006971 A    1/2004

OTHER PUBLICATIONS

European Patent Office; International Search Report and Written Opinion issued in Application No. PCT/US2024/050033; 13 pages; dated Jan. 3, 2025.

*Primary Examiner* — Le H Luu
(74) *Attorney, Agent, or Firm* — Gray Ice Higdon

(57) ABSTRACT

Implementations are directed to simulating automated telephone call(s) to be performed by an automated assistant. Processor(s) can receive user input and determine, based on the user input, that the user input includes: a request to cause the automated assistant to initiate an automated telephone call with an entity, and a task to be performed during the automated telephone call. In some implementations, the processor(s) can cause a simulation of the automated telephone call to be performed to simulate the task, and, based on a result of the simulation, determine whether to initiate the automated telephone call or to refrain from initiating the automated telephone call. In additional or alternative implementations, the processor(s) can determine whether to cause the simulation of the automated telephone call to be performed based on a type of the entity, a type of the task, and/or whether a prior simulation of the task has been performed.

20 Claims, 8 Drawing Sheets

(58) Field of Classification Search
CPC ...... H04L 51/02; G01C 21/362; G06N 3/004; H04M 1/72454; H04M 3/4936; H04M 3/5233
See application file for complete search history.

(56) References Cited

U.S. PATENT DOCUMENTS

| | | | |
|---|---|---|---|
| 2010/0004910 A1* | 1/2010 | Chussil | G06N 3/004 703/6 |
| 2013/0304758 A1* | 11/2013 | Gruber | G06F 16/9535 707/769 |
| 2016/0003637 A1* | 1/2016 | Andersen | G01C 21/362 701/519 |
| 2016/0188738 A1* | 6/2016 | Gruber | G06F 16/248 707/769 |
| 2016/0189558 A1 | 6/2016 | McGann | |
| 2021/0400141 A1* | 12/2021 | Feast | H04M 3/5233 |
| 2022/0051664 A1* | 2/2022 | Baror | H04M 3/4936 |
| 2023/0053267 A1* | 2/2023 | Aher | H04M 1/72454 |

\* cited by examiner

SIMULATION OF AUTOMATED TELEPHONE CALL(S)

BACKGROUND

Humans may engage in human-to-computer dialogs with interactive software applications referred to as "chatbots," "automated assistants", "intelligent personal assistants," etc. (referred to herein as "automated assistants"). As one example, these automated assistants may correspond to a machine learning model or a combination of different machine learning models, and may be utilized to perform various tasks on behalf of users. For instance, some of these automated assistants can initiate telephone calls and conduct conversations with various humans during the telephone calls to perform task(s) on behalf of the users (referred to herein as "automated telephone calls"). In performing these automated telephone calls, these automated assistants can cause corresponding instances of synthesized speech to be rendered at a corresponding client device of the various human users, and receive instances of corresponding responses from the various human users. Based on the instances of the synthesized speech and/or the instances of the corresponding responses, these automated assistants can determine a result of performance of the task(s), and cause an indication of the result of the performance of the task(s) to be provided for presentation to the users.

However, these automated assistants typically do not have any context about these automated telephone calls other than what is explicitly provided by the user. For example, assume a user says "Assistant, call Hypothetical Café Food Truck and make a reservation for four people tonight", then the user's automated assistant can determine an entity—Hypothetical Café Food Truck, a food truck for a fictitious restaurant names hypothetical café—and a task—to make restaurant reservations for four people on an evening of the current day. However, many of these automated assistants may not be able to determine that food trucks are first come, first serve, and that they do not typically make reservations. Nonetheless, further assume that the user's automated assistant obtains a phone number associated with Hypothetical Café Food Truck, and initiates an automated telephone call with Hypothetical Café Food Truck to make the reservation, but that Hypothetical Café Food Truck indicates that they do not take reservations. Not only does this result in computational resources being wasted at the user's client device since the client device processed the request, but this also results in network resources being wasted since the automated telephone call was initiated. Accordingly, there is a need in the art for more robust automated assistants that are capable of intelligently initiating and/or conducting automated telephone calls.

SUMMARY

Implementations are directed to simulating automated telephone call(s) to be performed by an automated assistant. Processor(s) can receive user input and determine, based on the user input, that the user input includes: a request to cause the automated assistant to initiate an automated telephone call with an entity, and a task to be performed during the automated telephone call. In some implementations, the processor(s) can cause a simulation of the automated telephone call to be performed to simulate the task, and, based on a result of the simulation, determine whether to initiate the automated telephone call or to refrain from initiating the automated telephone call. By causing the simulation of the automated telephone call to be performed to simulate the task, and prior to actually initiating the automated telephone call, the processor(s) can determine whether the task (e.g., as specified by the user) is, in fact, suitable for performance with respect to the entity. This mitigates and/or eliminates instances in which automated telephone calls are initiated and/or conducted for tasks which are objectively not suitable for performance with respect to the entity, thereby conserving computational and/or network resources.

For example, assume that the user of the client device provides user input of "call the butcher on $1^{st}$ street and order a pound of beef and a pound of pork". In response to receiving the user input, the processor(s) can determine a request to cause the automated assistant to initiate an automated telephone call with an entity—the butcher on $1^{st}$ street—and a task to be performed by the automated assistant during the automated telephone call with the entity-order a pound of beef and a pound of pork. However, prior to initiating the automated telephone call to perform the task, the processor(s) can cause a simulation of the automated telephone call to be performed to simulate the task. For instance, the processor(s) can cause a simulation to be configured, in a simulated environment, where the automated assistant can interact with a language model (such as a large language model (LLM)) that emulates the entity. Accordingly, in this example, the processor(s) can cause the LM to emulate the butcher on $1^{st}$ street.

In some instances, the LM can be prompted with contextual information that indicates the LM is to engage in a corresponding conversation with the automated assistant from the perspective of the butcher on $1^{st}$ street and be provided with additional information about the butcher on $1^{st}$ street (e.g., a location of the butcher on $1^{st}$ street, operating hours of the butcher on $1^{st}$ street, meats or other goods sold by the butcher on $1^{st}$ street, and so on). Notably, this context information can be obtained, for example, from a database, the Internet, and/or by other means. In other instances, the LM can be fine-tuned to emulate the butcher on $1^{st}$ street or, more generally, a butcher. Notably, in fine-tuning the LM to emulate the butcher on $1^{st}$ street (or the more general butcher), the processor(s) can obtain a corpus of corresponding actual conversations conducted by representative(s) of the butcher on $1^{st}$ street, corresponding curated conversations for the representative(s) of the butcher on $1^{st}$ street, and/or other corpora of conversations to cause the fine-tuned LM to reflect the butcher on $1^{st}$ street.

Notably, and in causing the simulation of the automated telephone call to be performed to simulate the task, the processor(s) can cause the automated assistant to render one or more corresponding instances of simulated synthesized speech that are based on the task to be performed during the automated telephone call, and can receive, from the LM that emulates the entity, one or more corresponding simulated responses that are responsive to one or more of the corresponding instances of the simulated synthesized speech. In this example, the automated assistant can provide output of "Hello, I'm [user's] assistant, and would like to order a pound of beef and a pound of pork on his behalf". Assuming that the butcher on $1^{st}$ street can accommodate the user's order, the LM that emulates the butcher on $1^{st}$ street can generate one or more corresponding responses that indicate the butcher on $1^{st}$ street can provide the pound of beef and the pound of pork. However, assuming that butcher on $1^{st}$ street cannot accommodate the user's order (e.g., the butcher on $1^{st}$ street is a kosher butcher and pork is not kosher), the LM that emulates the butcher on $1^{st}$ street can generate one or more corresponding responses that indicate the butcher on $1^{st}$ street can provide the pound of beef, but not the pound of pork. Although the above example is described with respect to causing the automated assistant to render one or more corresponding instances of simulated synthesized speech and the LM providing the one or more corresponding simulated responses, it should be understood that is for the sake of example and is not meant to be limiting. For instance, the processor(s) can cause the automated assistant to render one or more corresponding instances of textual content or some other low-level machine understandable language to further conserve computational resources in causing the simulation of the automated telephone call to be performed to simulate the task.

In some versions of those implementations, and assuming that the result of the simulation indicates that the task is advisable with respect to the entity, the processor(s) can cause the automated assistant to initiate the automated telephone call with the entity, and cause the automated assistant to perform the task during the automated telephone call with the entity. Continuing with the above example, and assuming that the butcher on $1^{st}$ street can provide the pound of beef and the pound of pork based on the result of the simulation, the processor(s) can cause the automated assistant to obtain a telephone number associated the butcher on $1^{st}$ street and initiate the automated telephone call with the butcher on $1^{st}$ street using the telephone number that was obtained. Further, and in causing the automated assistant to perform the task during the automated telephone call with the butcher on $1^{st}$ street, the automated assistant can render one or more corresponding instances of synthesized speech that are based on the task to be performed (e.g., in the same or similar manner described above with respect to the simulation) at an additional client device associated with a representative of the butcher on $1^{st}$ street. Further, the processor(s) can receive, from the representative associated with the butcher on $1^{st}$ street, one or more corresponding responses that are responsive to one or more of the corresponding instances of the synthesized speech. Moreover, the processor(s) can determine a result of performance of the task (e.g., whether the task was successful, whether the task was unsuccessful, and/or other information associated with performance of the task), and cause an indication of the result of performance of the task to be provided for presentation to the user via the client device. Accordingly, in this example, and assuming that the butcher on $1^{st}$ street can, in fact, provide the pound of beef and the pound of pork, the processor(s) can notify the user the butcher on $1^{st}$ street can provide the pound of beef and the pound of pork, confirm that the pound of beef and the pound of pork has been ordered on behalf of the user, provide pick-up information to the user on when to pick-up the pound of beef and the pound of pork, etc.

In some further versions of those implementations, and assuming that the result of the simulation indicates that the task is advisable with respect to the entity, the processor(s) can cause the automated assistant to leverage aspect(s) of the simulation in performing the task during the automated telephone call. Continuing with the above example, and assuming that the butcher on 1st street can provide the pound of beef and the pound of pork based on the result of the simulation, the processor(s) can cause the automated assistant to utilize one or more of the corresponding instances of the simulated synthesized speech, that were generated during the simulation, as one or more of the corresponding instances of synthesized speech to be rendered at the additional client device. This obviates the need for the processor(s) to generate one or more of the corresponding instances of synthesized speech to be rendered at the additional client device in real-time. Not only does this converse computational resources at the client device in instances where the automated telephone call is implemented locally at the client device (or a server in instances where the automated telephone call is cloud-based), but this also reduces latency in causing one or more of the corresponding instances of synthesized speech to be rendered at the additional client device.

In additional or alternative versions of those implementations, and assuming that the result of the simulation indicates that the task is not advisable with respect to the entity, the processor(s) can determine whether to recommend modifying the task to be performed during the automated telephone call with the entity and based on the result of the simulation. Further, and in response to determining to recommend modifying the task to be performed during the automated telephone call with the entity, the processor(s) can determine modified task(s) to be performed during the automated telephone call with the entity and in lieu of the task initially determined based on processing the user input, and cause an indication of the modified task(s) to be provided for presentation to the user. Continuing with the above example, and assuming that the butcher on $1^{st}$ street can provide the pound of beef but not the pound of pork based on the result of the simulation, the processor(s) can determine to recommend modifying the task to be performed during the automated telephone call. For instance, the processor(s) can determine to modify parameter(s) of the task, such as recommending to omit requesting the pound of pork, or determine to modify the entity to an additional entity (e.g., another butcher that is within a threshold distance of the butcher on $1^{st}$ street or a threshold distance of a current location of the user) that can provide both the pound of beef and the pound of pork. In this example, the processor(s) can cause the automated assistant to provide these modified task(s) as, for example, suggestion chip(s) that are selectable by the user.

In some further versions of those implementations, and assuming that the processor(s) receive additional user input that selects a given one of the modified task(s) (e.g., via a corresponding suggestion chip that is associated with the given modified task), the processor(s) can then cause the automated assistant to perform the given one of the modified task(s). Continuing with the above example, assume the user decides to order the pound of beef, but no longer desires the pound of pork. In this example, the processor(s) can cause the automated assistant to initiate the automated telephone call with the butcher on $1^{st}$ street, but only request the pound of beef. In additional or alternative further versions of those implementations, the processor(s) may receive additional user input that modifies the task, but is not one of the modified task(s) proposed by the automated assistant. For instance, assume that the user provides additional user input of "okay, order a pound of shrimp instead of the pork". In this example, the processor(s) may re-simulate the automated telephone call to order a pound of beef and a pound of shrimp, and proceed in the same or similar manner described above.

In additional or alternative versions of those implementations, and in response to determining to recommend to not perform the automated telephone call with the entity, the processor(s) can cause the automated assistant to provide a recommendation to not perform the automated telephone call with the entity to be provided for presentation to the user via the client device. Continuing with the above example, assume that the user input provided by the user was "call the butcher on 1$^{st}$ street and tell them their meat gave me food poisoning". In this example, the processor(s) may determine that the task is not advisable based on a result of the simulation, and that there are no viable alternatives to recommend for modifying the task. Rather, in this example, the user may simply be using the automated assistant to vent frustrations related to having food poisoning that may, or may not have, been caused by the user consuming meat from the butcher on 1$^{st}$ street. Accordingly, in these implementations, the processor(s) from wasting computational resources and/or network resources in instances where there is no productive value if the task is to be performed.

In additional or alternative implementations, the processor(s) can determine whether to cause the simulation of the automated telephone call to be performed based on a type of the entity, a type of the task, and/or whether a prior simulation of the task has been performed. By determining whether to cause the simulation of the automated telephone call to be performed, the processor(s) can balance latency and usage of computational and/or network resources. This mitigates and/or eliminates instances in which simulations are duplicated, thereby conserving computational and/or network resources.

In some versions of those implementations, the processor(s) can determine whether to cause the simulation of the automated telephone call to be performed based on the type of the entity. As described herein, entities can be defined with varying degrees of granularity. For instance, an entity can reference a person, a business, a place, etc. Further, a restaurant can be a more general business entity, or a more specific cuisine type entity for the cuisine types that it serves, the chain it is a part of (if any), etc. Moreover, an airline can be a more general transportation entity, or a more specific to air transportation (compared to, for instance, a ground transportation entity), the name of the airline itself, etc. In these implementations, and assuming that the type of entity is a particular type of entity for which the processor(s) are to cause the simulation of the automated telephone call to be performed, the processor(s) can cause the simulation to be performed. However, and assuming that the type of entity is not a particular type of entity for which the processor(s) are to cause the simulation of the automated telephone call to be performed, the processor(s) can refrain from causing the simulation to be performed and proceed with causing the automated assistant to initiate the automated telephone call.

In additional or alternative versions of those implementations, the processor(s) can, additionally or alternatively, determine whether to cause the simulation of the automated telephone call to be performed based on the type of the task. In these implementations, and assuming that the type of task is a particular type of task for which the processor(s) are to cause the simulation of the automated telephone call to be performed, the processor(s) can cause the simulation to be performed. However, and assuming that the type of task is not a particular type of task for which the processor(s) are to cause the simulation of the automated telephone call to be performed, the processor(s) can refrain from causing the simulation to be performed and proceed with causing the automated assistant to initiate the automated telephone call. Notably, in implementations where both the type of entity and the type of task are considered for determining whether to cause the simulation of the automated telephone call to be performed, the processor(s) may be configured to cause the simulation to be performed only if one of the type of entity if the particular type of entity or the type of task is the particular type of task to cause the simulation of the automated telephone call to be performed. Alternatively, the processor(s) may be configured to cause the simulation to be performed only if both of the type of entity is the particular type of entity and the type of task is the particular type of task to cause the simulation of the automated telephone call to be performed.

In additional or alternative versions of those implementations, the processor(s) can, additionally or alternatively, determine whether to cause the simulation of the automated telephone call to be performed based on whether a prior simulation of the task has been performed. The prior simulation can be based on, for example, prior user input provided by the user of the client device, prior user input provided by an additional user of an additional client device, or based on prior simulations performed based on a database of corresponding conversations between users and the entity. In these implementations, a prior result from the prior simulations can be utilized to determine whether to initiate the automated telephone call or to refrain from initiating the automated telephone call as described above. In these implementations, not only can these prior simulations be leveraged to conserve computational resources by refraining from causing the simulation to be duplicated, but these prior simulations can also be leveraged to reduce latency in making the determination of whether to initiate the automated telephone call or to refrain from initiating the automated telephone call as described above.

The above description is provided as an overview of only some implementations disclosed herein. Those implementations, and other implementations, are described in additional detail herein.

DETAILED DESCRIPTION

Figure 1:
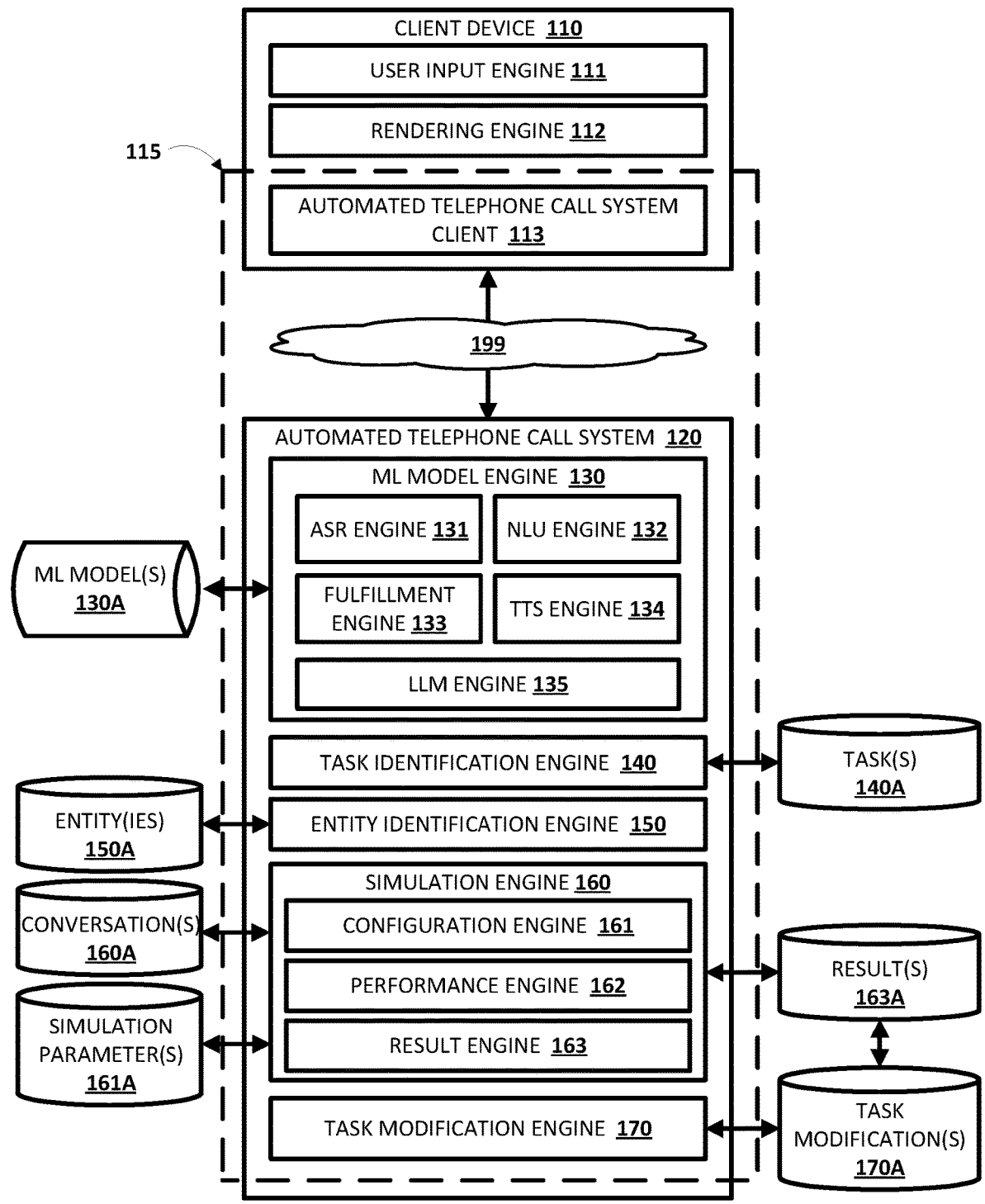
FIG. 1 depicts a block diagram of an example environment that demonstrates various aspects of the present disclosure, and in which implementations disclosed herein can be implemented.

Turning now to FIG. 1, a block diagram of an example environment that demonstrates various aspects of the present disclosure, and in which implementations disclosed herein can be implemented is depicted. A client device 110 is illustrated in FIG. 1, and includes, in various implementations, a user input engine 111, a rendering engine 112, and an automated telephone call system client 113. The client device 110 may be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device, etc.). Additional and/or alternative client devices may be provided.

The user input engine 111 can detect various types of user input at the client device 110. In some examples, the user input detected at the client device 110 can include spoken utterance(s) of a human user of the client device 110 that is detected via microphone(s) of the client device 110. In these examples, the microphone(s) of the client device 110 can generate audio data that captures the spoken utterance(s). In other examples, the user input detected at the client device 110 can include touch input of a human user of the client device 110 that is detected via user interface input device(s) (e.g., touch sensitive display(s)) of the client device 110, and/or typed input detected via user interface input device(s) (e.g., touch sensitive display(s) and/or keyboard(s)) of the client device 110. In these examples, the user interface input device(s) of the client device 110 can generate textual data that captures the touch input and/or the typed input.

The rendering engine 112 can cause content and/or other output to be visually rendered for presentation to the user at the client device 110 (e.g., via a touch sensitive display or other user interface output device(s)) and/or audibly rendered for presentation to the user at the client device 110 (e.g., via speaker(s) or other user interface output device(s)). The content and/or other output can include, for example, a transcript of a dialog between a user of the client device 110 and an automated assistant 115 executing at least in part at the client device 110, a transcript of a dialog between the automated assistant 115 executing at least in part at the client device 110 and an additional user that is in addition to the user of the client device 110, notifications, selectable graphical elements, and/or any other content and/or output described herein.

Further, the client device 110 is illustrated in FIG. 1 as communicatively coupled, over one or more networks 199 (e.g., any combination of Wi-Fi, Bluetooth, or other local area networks (LANs); ethernet, the Internet, or other wide area networks (WANs); and/or other networks), to an automated telephone call system 120. The automated telephone call system 120 can be, for example, a high-performance server, a cluster of high-performance servers, and/or any other computing device that is remote from the client device 110. The automated telephone call system 120 includes, in various implementations, a machine learning (ML) model engine 130, a task identification engine 140, an entity identification engine 150, a simulation engine 160, and a task modification engine 170. The ML model engine 130 can include various sub-engines, such as an automatic speech recognition (ASR) engine 131, a natural language understanding (NLU) engine 132, a fulfillment engine 133, a text-to-speech (TTS) engine 134, and a large language model (LLM) engine 135. These various sub-engines can utilize one or more respective ML models (e.g., stored in database 130A). Further, the simulation engine 160 can include various sub-engines, such as configuration engine 161, performance engine 162, and result engine 163.

The automated telephone call system 120 can leverage various databases. For instance, the ML model engine 130 can leverage ML model(s) database 130A that stores various ML model(s); the task identification engine 140 can leverage task(s) database 140A that stores various task(s), parameter(s) associated with the task(s), entity(ies) that can be interacted with to perform the task(s); the entity identification engine 150 can leverage entity(ies) database 150A that stores entity(ies); the simulation engine 160 can leverage conversation(s) database 160A that stores various conversation(s) between user(s), automated assistant(s), and/or other conversation(s), the simulation engine 160 can leverage simulation parameter(s) database 161A that stores parameter(s) that can be utilized to configure a simulated environment; the simulation engine 160 can leverage result(s) database 163A that stores results from simulations that are performed using the simulation engine 160; and the task modification engine 170 can leverage task modification(s) engine database 170A that stores task(s) and modified task(s) that are associated with the task(s). Although FIG. 1 is depicted with respect to certain engines and/or sub-engines of the automated telephone call system 120 having access to certain databases, it should be understood that is for the sake of example and is not meant to be limiting.

Moreover, the client device 110 can execute the automated telephone call system client 113. An instance of the automated telephone call system client 113 can be an application that is separate from an operating system of the client device 110 (e.g., installed "on top" of the operating system)—or can alternatively be implemented directly by the operating system of the client device 110. The automated telephone call system client 113 can implement the automated telephone call system 120 locally at the client device 110 and/or remotely from the client device 110 via one or more of the networks 199 (e.g., as shown in FIG. 1). The automated telephone call system client 113 (and optionally by way of its interactions with the automated telephone call system 120) may form what appears to be, from a user's perspective, a logical instance of a portion of the automated assistant 115 with which the user may engage in a human-to-computer dialog. An instance of the automated assistant 115 is depicted in FIG. 1, and is encompassed by a dashed line that includes the automated telephone call system client 113 of the client device 110 and the automated telephone call system 120.

Furthermore, the client device 110 and/or the automated telephone call system 120 may include one or more memories for storage of data and software applications, one or more processors for accessing data and executing the software applications, and other components that facilitate communication over one or more of the networks 199. In some implementations, one or more of the software applications can be installed locally at the client device 110, whereas in other implementations one or more of the software applications can be hosted remotely from the client device 110 (e.g., by one or more servers), but accessible by the client device 110 over one or more of the networks 199.

As described herein, the automated telephone call system 120 can be utilized to simulate automated telephone call(s) (e.g., as described with respect to FIG. 3) in an effort to conserve computational resources and/or network resources. In implementations where the automated telephone call system 120 is utilized to simulate the automated telephone call(s), the simulation can be performed prior to actually initiating the automated telephone call to determine whether a task specified by a user of the client device 110 is, in fact, suitable for performance with respect to an entity that is also specified by the user of the client device. This mitigates and/or eliminates instances in which automated telephone calls are initiated and/or conducted for tasks which are objectively not suitable for performance with respect to the entity, thereby conserving computational and/or network resources. Further, the automated telephone call system 120 can additionally, or alternatively, be utilized to determine whether to simulate automated telephone call(s) (e.g., as described with respect to FIG. 4) in an effort to conserve computational resources and/or network resources. In implementations where the automated telephone call system 120 is utilized to determine whether to simulate the automated telephone call(s), usage of computational and/or network resources can be reduced in instances where a prior simulation was conducted, and also reducing latency in initiating the automated telephone call(s) and/or notifying the user that the task as specified by the user of the client device 110 is not suitable for performance with respect to the entity. This mitigates and/or eliminates instances in which simulations are duplicated, thereby conserving computational and/or network resources.

The automated telephone call(s) described herein can be conducted by the automated assistant 115. For example, the automated telephone call(s) can be telephone calls conducted using Voice over Internet Protocol (VoIP), public switched telephone networks (PSTN), and/or other telephonic communication protocols. Further, the automated telephone call(s) described herein are automated in that the automated assistant 115 conducts the automated telephone call(s) using one or more of the components depicted in FIG. 1, on behalf of a user of the client device 110, and the user of the client device 110 is not an active participant in the automated telephone call(s).

In various implementations, the ASR engine 131 can process, using ASR model(s) stored in the ML model(s) database 130A (e.g., a recurrent neural network (RNN) model, a transformer model, and/or any other type of ML model capable of performing ASR), audio data that captures a spoken utterance and that is generated by microphone(s) of the client device 110 (or microphone(s) of an additional client device) to generate ASR output. Further, the NLU engine 132 can process, using NLU model(s) stored in the ML model(s) database 130A (e.g., a long short-term memory (LSTM), gated recurrent unit (GRU), and/or any other type of RNN or other ML model capable of performing NLU) and/or NLU rule(s), the ASR output (or other typed or touch inputs received via the user input engine 111 of the client device 110) to generate NLU output. Moreover, the fulfillment engine 133 can process, using fulfillment model(s) and/or fulfillment rules stored in the ML model(s) database 130A, the NLU data to generate fulfillment output. Additionally, the TTS engine 134 can process, using TTS model(s) stored in the ML model(s) database 130A, textual data (e.g., text formulated by the automated assistant 115) to generate synthesized speech audio data that includes computer-generated synthesized speech. Furthermore, in various implementations, the LLM engine 135 can replace one or more of the aforementioned components. For instance, the LLM engine 135 can replace the NLU engine 132 and/or the fulfillment engine 133. In these implementations, the LLM engine 135 can process, using LLM(s) stored in the ML model(s) database 130A (e.g., PaLM, BARD, BERT, LaMDA, Meena, GPT, and/or any other LLM, such as any other LLM that is encoder-only based, decoder-only based, sequence-to-sequence based and that optionally includes an attention mechanism or other memory), the ASR output (or other typed or touch inputs received via the user input engine 120 of the client device 110) to generate LLM output.

In various implementations, the ASR output can include, for example, a plurality of speech hypotheses (e.g., term hypotheses and/or transcription hypotheses) that are predicted to correspond to spoken utterance(s) based on the processing of audio data that captures the spoken utterance(s). The ASR engine 131 can optionally select a particular speech hypotheses as recognized text for the spoken utterance(s) based on a corresponding value associated with each of the plurality of speech hypotheses (e.g., probability values, log likelihood values, and/or other values). In various implementations, the ASR model(s) stored in the ML model(s) database 130A are end-to-end speech recognition model(s), such that the ASR engine 131 can generate the plurality of speech hypotheses directly using the ASR model(s). For instance, the ASR model(s) can be end-to-end model(s) used to generate each of the plurality of speech hypotheses on a character-by-character basis (or other token-by-token basis). One non-limiting example of such end-to-end model(s) used to generate the recognized text on a character-by-character basis is a recurrent neural network transducer (RNN-T) model. An RNN-T model is a form of sequence-to-sequence model that does not employ attention mechanisms or other memory. In other implementations, the ASR model(s) are not end-to-end speech recognition model(s) such that the ASR engine 131 can instead generate predicted phoneme(s) (and/or other representations). For instance, the predicted phoneme(s) (and/or other representations) may then be utilized by the ASR engine 131 to determine a plurality of speech hypotheses that conform to the predicted phoneme(s). In doing so, the ASR engine 131 can optionally employ a decoding graph, a lexicon, and/or other resource(s). In various implementations, a corresponding transcription that includes the recognized text can be rendered at the client device 110.

In various implementations, the NLU output can include, for example, annotated recognized text that includes one or more annotations of the recognized text for one or more (e.g., all) of the terms of the recognized text. For example, the NLU engine 132 may include a part of speech tagger (not depicted) configured to annotate terms with their grammatical roles. Additionally, or alternatively, the NLU engine 132 may include an entity tagger (not depicted) configured to annotate entity references in one or more segments of the recognized text, such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. The entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity. Additionally, or alternatively, the NLU engine 132 may include a coreference resolver (not depicted) configured to group, or "cluster," references to the same entity based on one or more contextual cues. For example, the coreference resolver may be utilized to resolve the term "them" to "buy theatre tickets" in the natural language input "buy them", based on "theatre tickets" being mentioned in a client device notification rendered immediately prior to receiving input "buy them". In some implementations, one or more components of the NLU engine 132 may rely on annotations from one or more other components of the NLU engine 132. For example, in some implementations the entity tagger may rely on annotations from the coreference resolver in annotating all mentions to a particular entity. Also, for example, in some implementations, the coreference resolver may rely on annotations from the entity tagger in clustering references to the same entity. Also, for example, in some implementations, the coreference resolver may rely on user data of the user of the client device 110 in coreference resolution and/or entity resolution. The user data may include, for example, historical location data, historical temporal data, user preference data, user account data, calendar information, email data, and/or any other user data that is accessible at the client device 110.

In various implementations, the fulfillment output can include, for example, one or more tasks to be performed by the automated assistant 115. For example, the user can provide unstructured free-form natural language input in the form of spoken utterance(s). The spoken utterance(s) can include, for instance, an indication of the one or more tasks to be performed by the automated assistant 115. The one or more tasks may require the automated assistant 115 to provide certain information to the user, engage with one or more external systems on behalf of the user (e.g., an inventory system, a reservation system, etc. via a remote procedure call (RPC)), and/or any other task that may be specified by the user and performed by the automated assistant 115. Accordingly, it should be understood that the fulfillment output may be based on the one or more tasks to be performed by the automated assistant 115 and may be dependent on the corresponding conversations with the user.

In various implementations, the TTS engine 134 can generate synthesized speech audio data that captures computer-generated synthesized speech. The synthesized speech audio data can be rendered at the client device 110 via speaker(s) of the client device 110. The synthesized speech may include any output generated by the automated assistant 115 as described herein, and may include, for example, synthesized speech generated as part of a dialog between the user of the client device 110 and the automated assistant 115, as part of an automated telephone call between the automated assistant 115 and a representative associated with an entity, and so on.

In various implementations, the LLM output can include, for example, a probability distribution over a sequence of tokens, such as words, phrases, or other semantic units, that are predicted to be responsive to the spoken utterance(s) or other user inputs provided by the user of the client device 110. Notably, the LLM(s) stored in the ML model(s) database 130A can include billions of weights and/or parameters that are learned through training the LLM on enormous amounts of diverse data. This enables these LLM(s) to generate the LLM output as the probability distribution over the sequence of tokens. In these implementations, the LLM engine 135 can replace the NLU engine 132 and/or the fulfillment engine 133 since these LLM(s) can perform the same or similar functionality in terms of natural language processing.

Although FIG. 1 is described with respect to a single client device having a single user, it should be understood that is for the sake of example and is not meant to be limiting. For example, one or more additional client devices of a user can also implement the techniques described herein. For instance, the client device 110, the one or more additional client devices, and/or any other computing devices of the user can form an ecosystem of devices that can employ techniques described herein. These additional client devices and/or computing devices may be in communication with the client device 110 and/or the voice-based chatbot policy override system 120 (e.g., over the one or more networks 199). As another example, a given client device can be utilized by multiple users in a shared setting (e.g., a group of users, a household, etc.). Additional description of the task identification engine 140, the entity identification engine 150, the simulation engine 160, and the task modification engine 170 is provided herein (e.g., with respect to FIGS. 2, 3, and 4).

Figure 2:
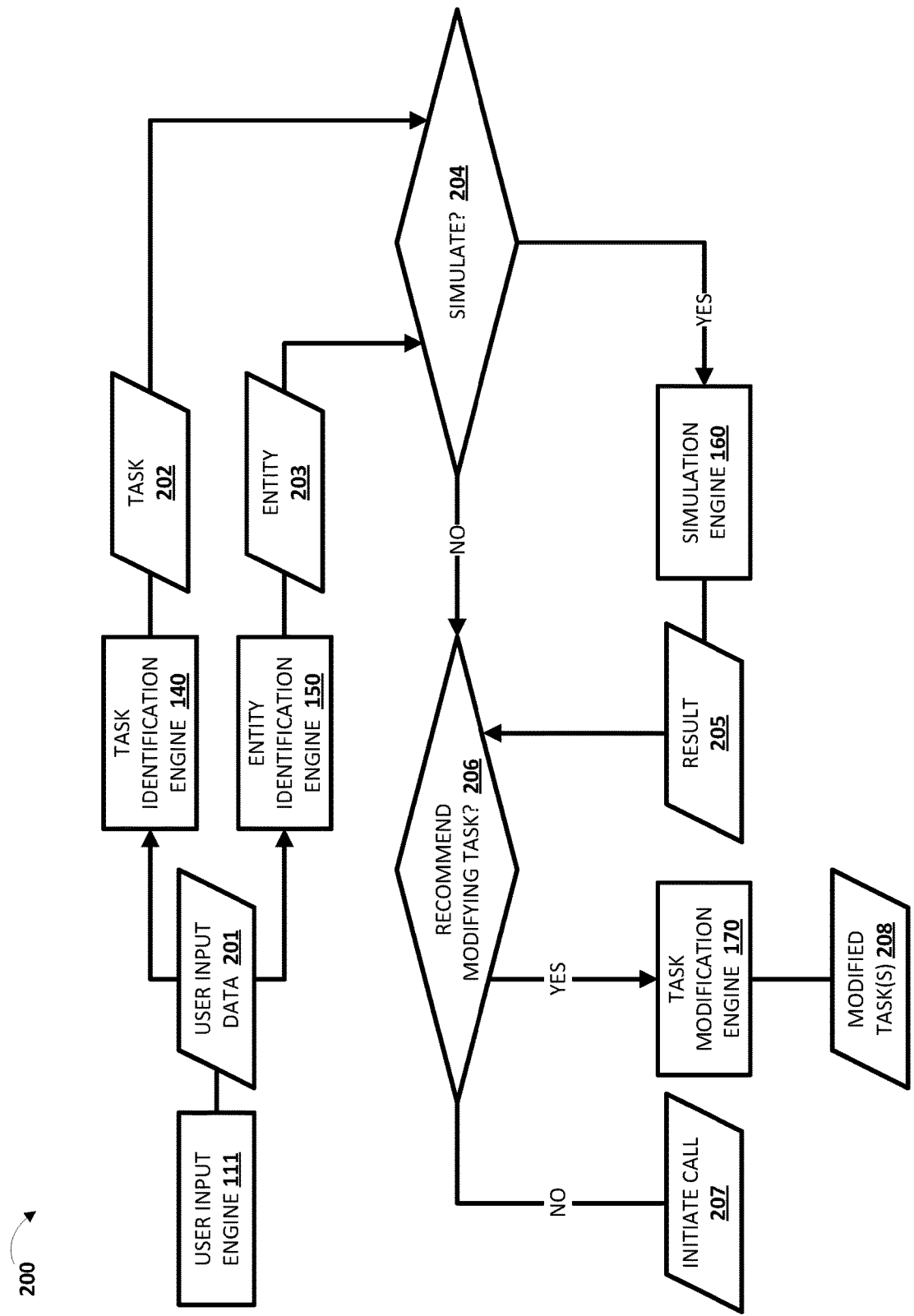
FIG. 2 depicts an example process using various components from the example environment from FIG. 1, in accordance with various implementations.

Referring now to FIG. 2, an example process 200 flow for utilizing various components from the example environment of FIG. 1 is depicted. For the sake of example, assume that a user of the client device 110 from FIG. 1 provides a spoken utterance as input at the client device 110 directed to the automated assistant 115 executing at least in part at the client device 110. The client device 110 may receive the spoken utterance via the user input engine 111 of the client device 110, and may generate audio data that captures the spoken utterance. Further, the audio data that captures the spoken utterance can be processed using the ML model engine 130 to generate user input data 201. The user input data 201 can include, for example, ASR output (e.g., generated using the ASR engine 131), NLU output (e.g., generated using the NLU engine 132), fulfillment output (e.g., generated using the fulfillment engine 133), and/or LLM output (e.g., generated using the LLM engine 135). Although the user input is described as being the spoken utterance, it should be understood that is for the sake of example and is not meant to be limiting. For instance, the user input may be typed input that is directed to the automated assistant 115 and/or touch input that is directed to suggestion chip(s) associated with task(s) that can be performed by the automated assistant 115.

Initially, the automated assistant 115 can cause the task identification engine 140 and/or the entity identification engine 150 to process the user input data 201. In doing so, the task identification engine 140 can determine a task 202 to be performed by the automated assistant 115 and based on processing the user input data 201, and the entity identification engine 150 can determine an entity 203 with respect to which the task 202 is to be performed by the automated assistant 115 and based on processing the user input data 201. For instance, the user input data 201 can include ASR output corresponding to recognized text for the spoken utterance, NLU output corresponding to annotated recognized text for the spoken utterance, fulfillment output corresponding to one or more tasks to be performed based on the spoken utterance, and/or LLM output corresponding to a sequence of tokens generated for the spoken utterance.

Further, the automated assistant 115 can determine whether to cause a simulation of the automated telephone call with the entity 203 to be performed (e.g., as indicated by 204). As described herein (e.g., with respect to FIG. 4), the automated assistant 115 can determines whether to cause the simulation of the automated telephone call with the entity to be performed based on, for example, a type of the task 202, a type of the entity 203, whether a prior result from one or more previously simulated automated telephone calls can be utilized as a proxy for the task 202 to be performed with respect to the entity 203 (e.g., stored in the result(s) database 163A), and/or based on other criteria. In response to the automated assistant 115 determining to cause the simulation of the automated telephone call with the entity 203 to be performed, the automated assistant 115 can cause the simulation engine 160 to perform the simulation and determine a result 205 of the simulation. Based on the result 205 of the simulation, the automated assistant 115 can then determine whether to recommend modifying the task 202 (e.g., as indicated by 206). Alternatively, in response to the automated assistant 115 determining not to cause the simulation of the automated telephone call with the entity 203 to be performed, the automated assistant 115 can then determine whether to recommend modifying the task 202 (e.g., as indicated by 206) based on the type of the task 202, the type of the entity 203, and/or the prior result from one or more of the previously simulated automated telephone calls that can be utilized as a proxy for the task 202 to be performed with respect to the entity 203.

Moreover, and assuming that the automated assistant 115 determines to not recommend modifying the task 202, the automated assistant 115 can initiate the automated telephone call with the entity 203 to perform the task 202 on behalf of the user of the client device 110 (e.g., as indicated by 207). In initiating the call to perform the task, the automated assistant 115 can optionally leverage aspect(s) of the simulation (e.g., corresponding instance(s) of simulated synthesized speech) to conserve computational resources and reduce latency in performing the task 202. However, and assuming that the automated assistant 115 determines to recommend modifying the task 202, the automated assistant 115 can cause the task modification engine 170 to determine one or more modified tasks 208 that are modifications of the task 202 (and optionally leveraging the task modification(s) database 170A). Notably, the one or more modified tasks 208 can include modified parameter(s) for the task 202 or a different entity (e.g., that is different from the entity 203) with respect to which the task 202 is to be performed. Some non-limiting examples of modified task(s) are provided with respect to FIGS. 5A, 5B, and 5C. Assuming that the user of the client device 110 selects a given one of the one or more modified tasks 208, then automated assistant 115 can then initiate the automated telephone call and perform the given one of the one or more modified tasks 208 and in lieu of the task 202.

Figure 3:
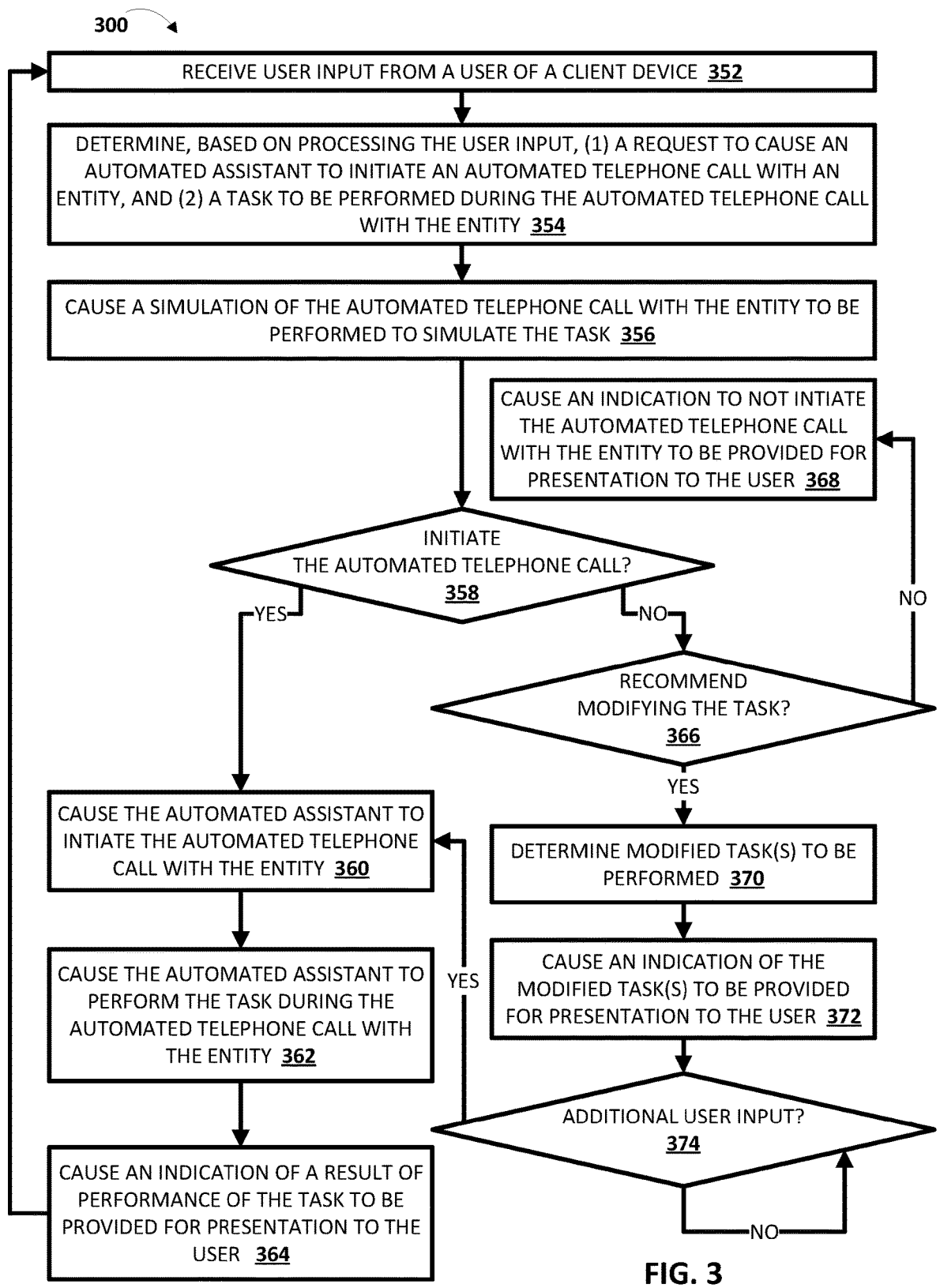
FIG. 3 depicts a flowchart illustrating an example method of simulating automated telephone call(s), in accordance with various implementations.

Turning now to FIG. 3, a flowchart illustrating an example method 300 of simulating automated telephone call(s) is depicted. For convenience, the operations of the method 300 are described with reference to a system that performs the operations. This system of the method 300 includes at least one processor, memory, and/or other component(s) of computing device(s) (e.g., client device 110 of FIG. 1, automated telephone call system 120 of FIG. 1, computing device 610 of FIG. 6, and/or other computing devices). Moreover, while operations of the method 300 are shown in a particular order, this is not meant to be limiting. One or more operations may be reordered, omitted, and/or added.

At block 352, the system receives user input from a user of a client device. For example, the user input can be a spoken utterance provided by the user of the client device, typed input provided by the user of the client device, touch input provided by the user of the client device, and/or any combination thereof.

At block 354, the system determines, based on processing the user input, (1) a request to cause an automated assistant to initiate an automated telephone call with an entity; and (2) a task to be performed during the automated telephone call with the entity. For example, the system can process the user input (e.g., using the ML model engine 130 from FIG. 1) to determine ASR output (in implementations where the user input is a spoken utterance), NLU output, fulfillment output, and/or LLM output. Further, the system can determine the request to cause the automated assistant to initiate the automated telephone call with the entity based on the ASR output (in implementations where the user input is a spoken utterance), the NLU output, the fulfillment output, and/or the LLM output. Moreover, the system can determine the task to be performed during the automated telephone call with the entity based on the ASR output (in implementations where the user input is a spoken utterance), the NLU output, the fulfillment output, and/or the LLM output.

At block 356, the system causes a simulation of the automated telephone call with the entity to be performed to simulate the task. For example, and referring to the simulation engine 160 of FIG. 1, the system can configure a simulated environment using one or more simulation parameters (e.g., stored in the simulation parameter(s) database 161A). In configuring the simulated environment, the system can cause the configuration engine 161 to obtain a language model (LM), such as an LLM, that emulates the entity. In some implementations, the LM can be prompted with contextual information that indicates the LM is to engage in a corresponding conversation with the automated assistant from the perspective of the entity and be provided with additional information about the entity (e.g., a location of the entity, operating hours of the entity, goods sold by entity, and so on). Notably, this context information can be obtained, for example, from a database, the Internet, and/or by other means. In other implementations, the LM can be fine-tuned to emulate the entity prior to the user input being received. Notably, in fine-tuning the LM to emulate the entity, the system can obtain (e.g., from the conversation(s) database 160A) a corpus of corresponding actual conversations conducted by representative(s) of the entity, corresponding curated conversations for the representative(s) of the entity, and/or other corpora of conversations to cause the fine-tuned LM to reflect the entity. Accordingly, the system can cause the simulation to reflect an actual conversation that could be had between the automated assistant and a representative of the entity.

Further, the system can cause the performance engine 162 to cause the simulation to be performed. In causing the simulation to be performed, the system can cause the performance engine 162 to render one or more corresponding instances of simulated synthesized speech that are based on the task to be performed during the automated telephone call. Further, the performance engine 162 can receive, from the LM that emulates the entity, one or more corresponding simulated responses that are responsive to one or more of the corresponding instances of the simulated synthesized speech. Although the above simulation is described with respect to causing one or more corresponding instances of simulated synthesized speech being rendered and the LM providing the one or more corresponding simulated responses, it should be understood that is for the sake of example and is not meant to be limiting. For instance, the performance engine 162 can render one or more corresponding instances of textual content or some other low-level machine understandable language to further conserve computational resources in causing the simulation of the automated telephone call to be performed to simulate the task.

Moreover, the system can cause the result engine 163 to determine a result of the simulation. In determining the result of the simulation, the system can cause the result engine 163 to analyze one or more corresponding simulated responses that are responsive to one or more of the corresponding instances of the simulated synthesized speech (or other simulated output). The result of the simulation may indicate, for example, whether or not performance of the task is advisable with respect to the entity. In implementations where performance of the task is advisable with respect to the entity (e.g., performance of the task as specified by the user was successful in the simulated environment), then the result of the simulation may indicate that the system should proceed with initiating the automated telephone call to perform the task. However, in implementations where performance of the task is not advisable with respect to the entity (e.g., performance of the task as specified by the user was not successful in the simulated environment), then the result of the simulation may indicate that system should recommend that the task should be modified by the user.

At block 358, the system determines, based on a result of the simulation, whether to initiate the automated telephone call or to refrain from initiating the automated telephone call. If, at an iteration of block 358, the system determines to initiate the automated telephone call based on the result of the simulation, then the system proceeds to block 360. At block 360, the system causes the automated assistant to initiate the automated telephone call with the entity. For example, the system can obtain a telephone number that is associated with the entity, and cause the automated assistant to initiate the automated telephone call with the entity using the telephone number. At block 362, the system causes the automated assistant to perform the task during the automated telephone call with the entity. For example, the system can cause the automated assistant to render one or more corresponding instances of synthesized speech that are based on the task to be performed during the automated telephone call. Further, the system can receive, from a representative associated with the entity, one or more corresponding responses that are responsive to one or more of the corresponding instances of the synthesized speech. At block 364, the system causes an indication of a result of performance of the task to be provided for presentation to the user. For example, the system can determine whether or not the task was successfully performed and notify the user of successful performance of the task, unsuccessful performance of the task, other details related to the task, and so on. The system returns to block 352 and waits for additional user input to initiate another iteration of the method 300.

If, at an iteration of block 358, the system determines to refrain from initiating the automated telephone call based on the result of the simulation, then the system proceeds to block 366. At block 366, the system determines, based on the result of the simulation, whether to recommend modifying the task to be performed. If, at an iteration of block 366, the system determines not to recommend modifying the task based on the result of the simulation, then the system proceeds to block 368. At block 368, the system causes an indication to not initiate the automated telephone call with the entity to be provided for presentation to the user. For example, the system can recommend to not initiate the automated telephone call in instances where the user's request is abusive, fraudulent, or otherwise inappropriate and there is no suitable modification to the task.

If, at an iteration of block 366, the system determines to recommend modifying the task based on the result of the simulation, then the system proceeds to block 370. At block 370, the system determines one or more modified tasks to be performed. Notably, the one or more modified tasks to be performed can include, for example, the same task but with different parameter(s) to be performed with respect to the same entity, the same task with the same parameter(s) but to be performed with respect to a different entity, and/or other any other suitable modifications of the task. In determining the one or more modified tasks, the system can leverage the result of the simulation. Accordingly, it should be understood that the one or more modified tasks that are recommended to the user may be dependent on the result of the simulation.

At block 372, the system causes an indication of one or more of the modified tasks to be provided for presentation to the user. For example, the indication of one or more of the modified tasks can be visually rendered for presentation to the user via a display of the client device (e.g., as suggestion chip(s) or the like) and/or audibly rendered for presentation to the user via speaker(s) of the client device.

At block 374, the system determines whether any additional user input that selects one or more of the modified tasks has been received. If, at an iteration of block 374, the system determines that no additional user input that selects one or more of the modified tasks has been received, then the system can continue to monitor for the additional user input at block 374. The system can continue monitoring for the additional user input until one or more termination criteria are satisfied. The one or more termination criteria can include, for example, a dialog between the user of the client device and the automated assistant concluding, a threshold duration of lapsing (e.g., a timeout period), and/or other termination criteria.

If, at an iteration of block 374, the system determines that additional user input that selects one or more of the modified tasks has been received, then the system can proceed to block 360. However, in performing the operations of block 362 when the system proceeds to block 360 from block 374, the system can perform the modified task that was selected via the additional user input. In other implementations, the additional user input may include an alternate task (e.g., that differs from the task originally specified by the user, and that also differs from the one or more modified tasks presented to the user). In these implementations, the system may return to block 356 to cause a simulation of the automated telephone call to be performed to simulate the alternate task and continue with the method 300.

Figure 4:
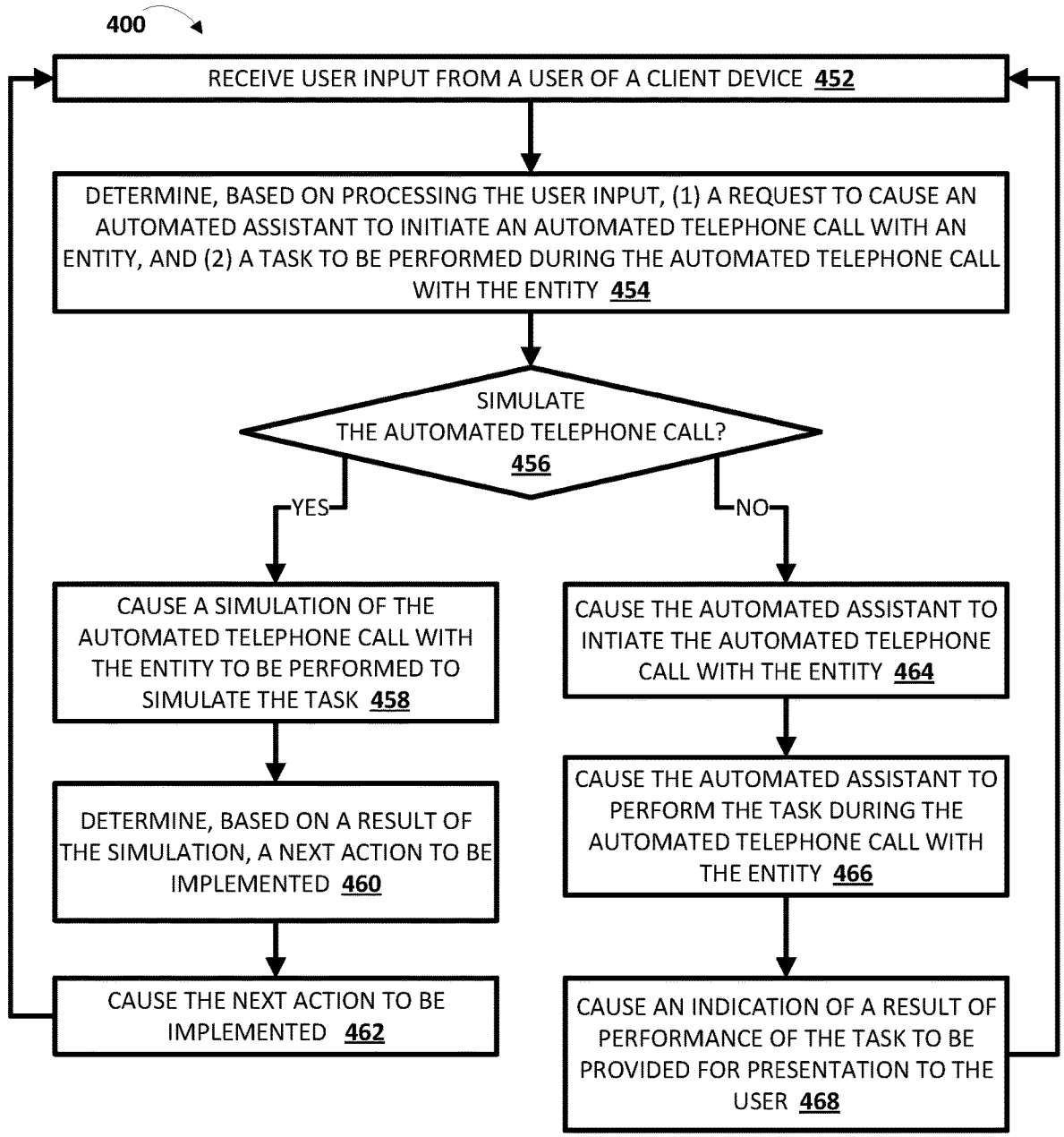
FIG. 4 depicts a flowchart illustrating an example method of determining whether to simulate automated telephone call(s), in accordance with various implementations.

Turning now to FIG. 4, a flowchart illustrating an example method 400 of determining whether to simulate automated telephone call(s) is depicted. For convenience, the operations of the method 400 are described with reference to a system that performs the operations. This system of the method 400 includes at least one processor, memory, and/or other component(s) of computing device(s) (e.g., client device 110 of FIG. 1, automated telephone call system 120 of FIG. 1, computing device 610 of FIG. 6, and/or other computing devices). Moreover, while operations of the method 400 are shown in a particular order, this is not meant to be limiting. One or more operations may be reordered, omitted, and/or added.

At block 452, the system receives user input from a user of a client device. At block 454, the system determines, based on processing the user input, (1) a request to cause an automated assistant to initiate an automated telephone call with an entity; and (2) a task to be performed during the automated telephone call with the entity. The operations of block 452 and 454 can be performed in the same or similar manner as described above with respect to blocks 352 and 354 of the method 300, respectively.

At block 456, the system determines whether to simulate the automated telephone call. The system can determine whether to simulate the automated telephone call based on, for example, a type of the entity, a type of the task, and/or previously simulated automated telephone call(s). For example, if the type of entity is a particular type of entity for which the system is to cause the simulation of the automated telephone call to be performed, the system can cause the simulation to be performed. However, if the type of entity is not a particular type of entity for which the system is to cause the simulation of the automated telephone call to be performed, the system can refrain from causing the simulation to be performed. Additionally, or alternatively, if the type of task is a particular type of task for which the system is to cause the simulation of the automated telephone call to be performed, the system can cause the simulation to be performed. However, if the type of task is not a particular type of task for which the system is to cause the simulation of the automated telephone call to be performed, the system can refrain from causing the simulation to be performed.

Notably, in implementations where both the type of entity and the type of task are considered for determining whether to cause the simulation of the automated telephone call to be performed, the system may be configured to cause the simulation to be performed only if one of the type of entity if the particular type of entity or the type of task is the particular type of task to cause the simulation of the automated telephone call to be performed. Alternatively, the system may be configured to cause the simulation to be performed only if both of the type of entity is the particular type of entity and the type of task is the particular type of task to cause the simulation of the automated telephone call to be performed.

Additionally, or alternatively, if a prior simulation of the task has been performed (e.g., with respect to the entity or an additional entity that is of the same type as the entity), then the system can refrain from causing the simulation to be performed. The prior simulation can be based on, for example, prior user input provided by the user of the client device, prior user input provided by an additional user of an additional client device, or based on prior simulations performed based on a database of corresponding conversations between users and the entity. Notably, the prior results from these prior simulations can be stored in one or more databases (e.g., the result(s) database 163A), which can be indexed by entity types, task types, and/or other indexing criteria. In these implementations, a prior result from the prior simulations can be utilized to determine whether to initiate the automated telephone call or to refrain from initiating the automated telephone call. Otherwise, the system can cause the simulation of the automated telephone call to be performed. In implementations where the system subsequently causes the simulation of the automated telephone call to be performed, the result of the simulation can be subsequently stored in one or more of the databases to mitigate and/or eliminate future occurrences of the same simulation.

If, at an iteration of block 456, the system determines to simulate the automated telephone call, then the system proceeds to block 458. At block 458, the system causes a simulation of the automated telephone call with the entity to be performed to simulate the task. The system can cause the simulation of the automated telephone call to be performed in the same or similar manner described with respect to block 356 of the method 300 of FIG. 3. At block 460, the system determines, based on a result of the simulation, a next action to be implemented. In determining the next action to be implemented, the system can, for instance, begin an iteration of the method 300 of FIG. 3 starting at block 358, and continue with the method 300 of FIG. 3. At block 462, the system causes the next action to be implemented. The system returns to block 452 subsequent to causing the next action to be implemented.

If, at an iteration of block 456, the system determines not to simulate the automated telephone call, then the system proceeds to block 464. At block 464, the system causes the automated assistant to initiate the automated telephone call with the entity. At block 466, the system causes the automated assistant to perform the task during the automated telephone call with the entity. At block 468, the system causes an indication of a result of performance of the task to be provided for presentation to the user. The system can perform the operations of blocks 464, 466, and 468 in the same or similar manner described with respect to the operations of blocks 360, 362, and 364 of the method 300 of FIG. 3, respectively.

Figure 5A:
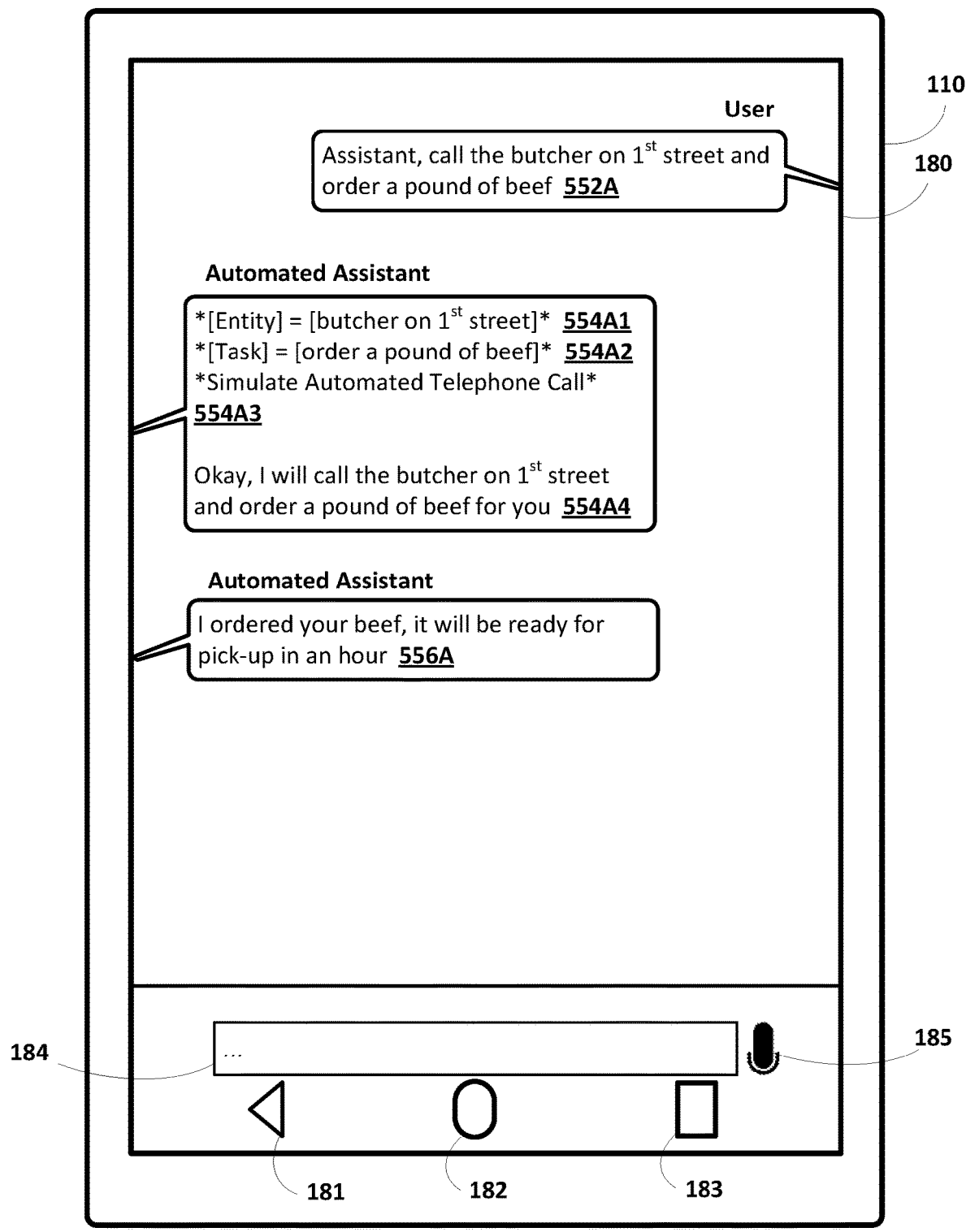
FIGS. 5A, 5B, and 5C depict various non-limiting examples of simulating automated telephone call(s), in accordance with various implementations.
Figure 5B:
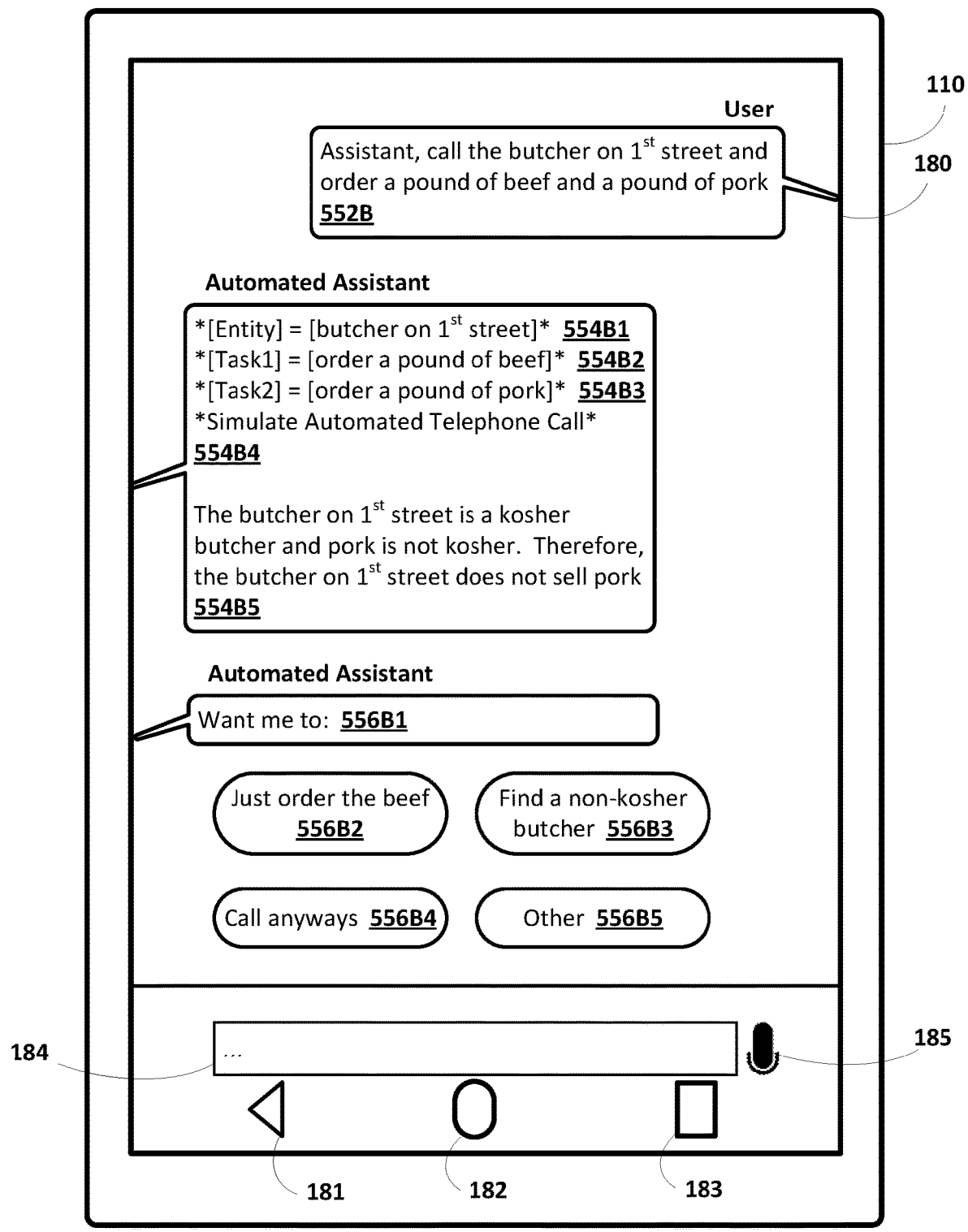
Figure 5C:
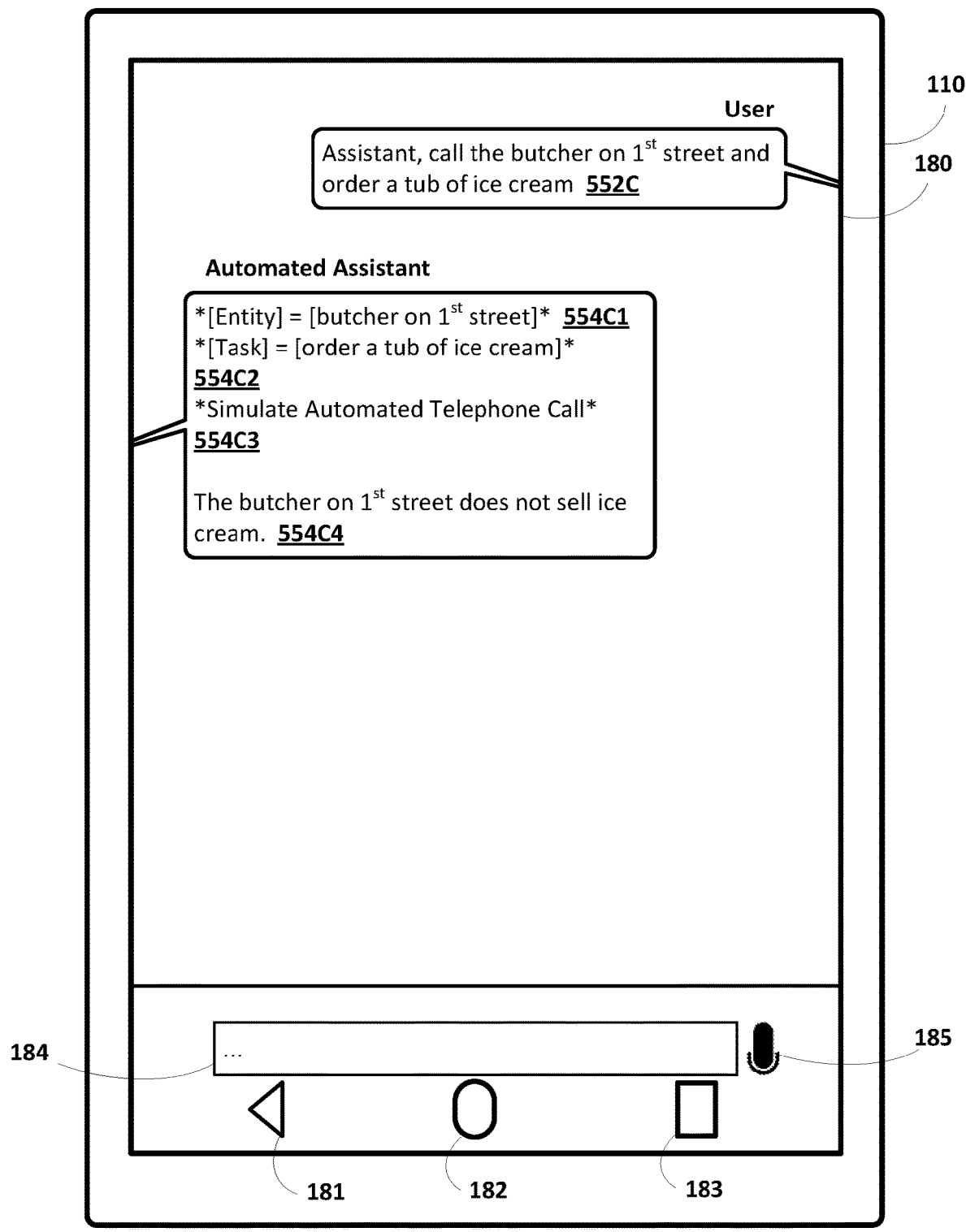

Turning now to FIGS. 5A, 5B, and 5C, various non-limiting examples of simulating automated telephone call(s) are depicted. FIGS. 5A, 5B, and 5C each depict a client device 110 (e.g., an instance of the client device 110 from FIG. 1) having a display 180. One or more aspects of an automated assistant associated with the client device 110 (e.g., an instance of the automated assistant 115 from FIG. 1) may be implemented locally on the client device 110 and/or on other client device(s) that are in network communication with the client device 110 in a distributed manner (e.g., via network(s) 199 of FIG. 1). For the sake of simplicity, operations of FIGS. 5A, 5B, and 5C are described herein as being performed by the automated assistant 115. Although the client device 110 of FIGS. 5A, 5B, and 5C is depicted as a mobile phone, it should be understood that is not meant to be limiting. The client device 110 can be, for example, a stand-alone assistant device (e.g., with speaker(s) and/or a display), a laptop, a desktop computer, a wearable computing device (e.g., a smart watch, smart headphones, etc.), a vehicular computing device, and/or any other client device capable of making telephonic calls.

The display 180 of FIGS. 5A, 5B, and 5C further includes a textual reply interface element 184 that the user may select to generate user input via a keyboard (virtual or real) or other touch and/or typed input, and a voice reply interface element 185 that the user may select to generate user input via microphone(s) of the client device 110. In some implementations, the user may generate user input via the microphone(s) without selection of the voice reply interface element 185. For example, active monitoring for audible user input via the microphone(s) may occur to obviate the need for the user to select the voice reply interface element 185. In some of those and/or in other implementations, the voice reply interface element 185 may be omitted. Moreover, in some implementations, the textual reply interface element 184 may additionally and/or alternatively be omitted (e.g., the user may only provide audible user input). The display 180 of FIGS. 5A, 5B, and 5C also includes system interface elements 181, 182, 183 that may be interacted with by the user to cause the client device 110 to perform one or more actions.

Referring specifically to FIG. 5A, assume that a user of the client device 110 provides user input 552A of "Assistant, call the butcher on $1^{st}$ street and order a pound of beef". In this example, the automated assistant 115 can process the user input to determine an entity, such as "butcher on $1^{st}$ street" as indicated by 554A1, and determine a task to be performed with respect to the entity, such as "order a pound of beef" as indicated by 554A2. Further, the automated assistant 115 can simulate the automated telephone call as indicated by 554A3. For the sake of example, assume that a result of the simulation indicates that the task of ordering a pound of beef is advisable with respect to the butcher on $1^{st}$ street. Put another way, assume that the result of the simulation indicates the butcher on $1^{st}$ street can provide the user with the pound of beef as requested by the user. Accordingly, the automated assistant 115 can determine to perform the task as specified by the user and as indicated by 554A4. Subsequent to performing the task (and optionally leveraging aspect(s) from the simulation, such as corresponding instance(s) of simulated synthesized speech), the automated assistant can provide an indication of a result of the task, such as indicating the task was successfully performed, and other details related to the task, such as a pick-up time for the beef, as indicated by 556A.

In contrast, and referring specifically to FIG. 5B, assume that the user of the client device 110 instead provides user input 552B of "Assistant, call the butcher on $1^{st}$ street and order a pound of beef and a pound of pork". In this example, the automated assistant 115 can again process the user input to determine an entity, such as "butcher on $1^{st}$ street" as indicated by 554B1, and determine a task to be performed with respect to the entity, such as "order a pound of beef" as indicated by 554B2 and "order a pound of pork" as indicated by 554A3. Further, the automated assistant 115 can simulate the automated telephone call as indicated by 554B4. For the sake of example, assume that a result of the simulation indicates that the task of ordering a pound of beef is advisable with respect to the butcher on $1^{st}$ street, but that the task of ordering a pound of pork is not advisable with respect to the butcher on $1^{st}$ street. Put another way, assume that the result of the simulation indicates the butcher on $1^{st}$ street can provide the user with the pound of beef as requested by the user, but cannot provide the user with the pound of pork as requested by the user. Accordingly, the automated assistant 115 can determine to refrain from performing the task as specified by the user and as indicated by 554B5. In doing so, the automated assistant 115 can optionally provide some rationale with respect to why performing the task is inadvisable with respect to the entity (e.g., "The butcher on $1^{st}$ street is a kosher butcher and pork is not kosher").

Nonetheless, the automated assistant 115 can determine one or more modified tasks that can be performed in lieu of the original task that was specified by the user via the user input 552B and as indicated by 556B1. For instance, the automated assistant 115 can provide a first suggestion chip 556B2 that is selectable to cause the automated assistant 115 to perform only the task of ordering the beef (i.e., and not the pork) from the kosher butcher. Additionally, or alternatively, the automated assistant 115 can provide a second suggestion chip 556B3 that is also selectable to cause the automated assistant 115 to find a non-kosher butcher from which the automated assistant 115 can order both the pound of beef and the pound of pork. Additionally, or alternatively, the automated assistant 115 can provide a third suggestion chip 556B4 that is also selectable to cause the automated assistant 115 to attempt to perform the original task that was specified by the user via the user input 552B. Additionally, or alternatively, the automated assistant 115 can provide a fourth suggestion chip 556B5 that is also selectable to enable the user to provide other user input (e.g., that specifies an alternate task).

Although particular suggestion chip(s) are depicted in FIG. 5B, it should be understood that those suggestion chips are provided for the sake of example and are not meant to be limiting. For instance, in various implementations, the third suggestion chip 556B4 that is also selectable to cause the automated assistant 115 to attempt to perform the original task that was specified by the user via the user input 552B may be omitted since the result of the simulation indicated that the task of ordering the pork from the kosher butcher is inadvisable. Also, for instance, in various implementations, the second suggestion chip 556B3 that is also selectable to cause the automated assistant 115 to find a non-kosher butcher from which the automated assistant 115 can order both the pound of beef and the pound of pork. Also, for instance, in various implementations, the user may have initially failed to specify a slot value for a parameter associated with the task (e.g., the user may have simply said "order beef and pork" without specifying a quantity of beef and/or a quantity of pork). In this instance, and even assuming the 1st street butcher did sell both beef and pork, an additional suggestion chip that requests the user of the client device 110 specify respective quantities of both beef and pork may be provided. Further, it should be understood that in various instances, no viable modified tasks may be available.

For example, and referring specifically to FIG. 5C, assume that the user of the client device 110 instead provides user input 552C of "Assistant, call the butcher on $1^{st}$ street and order a tub of ice cream". In this example, the automated assistant 115 can again process the user input to determine an entity, such as "butcher on $1^{st}$ street" as indicated by 554C1, and determine a task to be performed with respect to the entity, such as "order a tub of ice cream" as indicated by 554C2. Further, the automated assistant 115 can simulate the automated telephone call as indicated by 554C3. For the sake of example, assume that a result of the simulation indicates that the task of ordering a tub of ice cream is not advisable with respect to the butcher on $1^{st}$ street. Put another way, assume that the result of the simulation indicates the butcher on $1^{st}$ street does not sell ice cream. Accordingly, the automated assistant 115 can determine to refrain from performing the task as specified by the user and as indicated by 554C4. In doing so, the automated assistant 115 can optionally provide some rationale with respect to why performing the task is inadvisable with respect to the entity (e.g., "The butcher on $1^{st}$ street does not sell ice cream"). Accordingly, in this example, not only does the automated assistant 115 refrain from causing the automated telephone call from being performed, but the automated assistant 115 may not even provide any viable modified tasks.

Although the example of FIG. 5C is described with respect to the automated assistant 115 not providing any suggestion chip(s) for modified task(s), it should be understood that is for the sake of example and is not meant to be limiting. For instance, in various implementations, the automated assistant 115 could identify a nearby ice cream shop from which the automated assistant 115 can order the tub of ice cream. However, the example of FIG. 5C is intended to illustrate that butchers do not typically sell ice and that calling another butcher to order ice cream is likely futile and would only spam these butchers.

Figure 6:
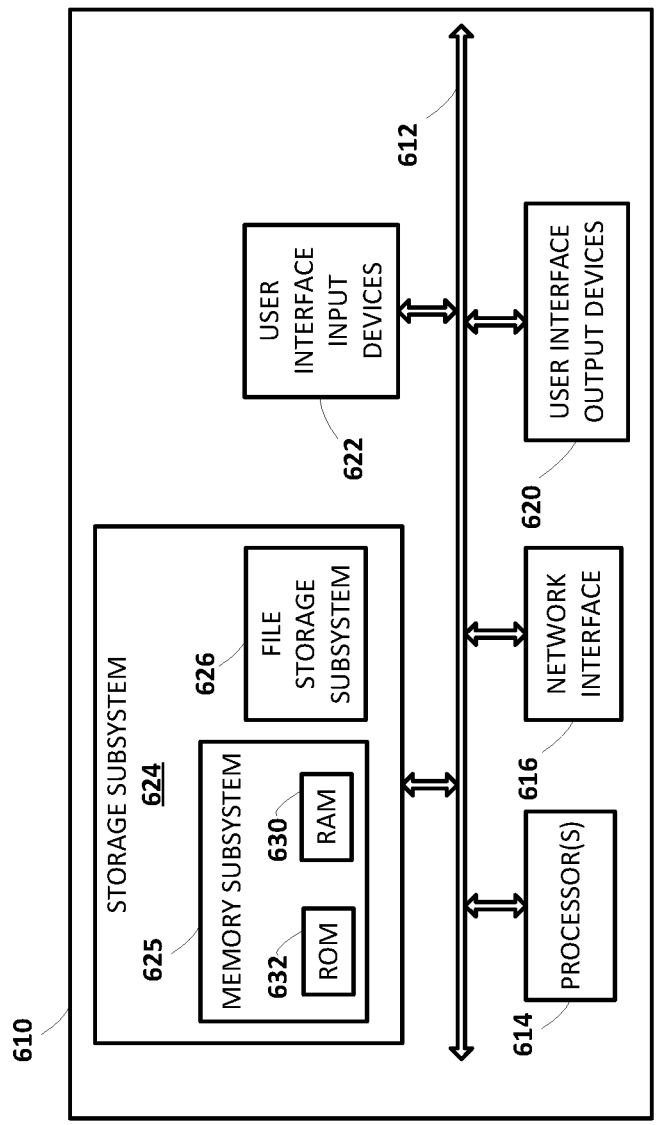
FIG. 6 depicts an example architecture of a computing device, in accordance with various implementations.

Turning now to FIG. 6, a block diagram of an example computing device 610 that may optionally be utilized to perform one or more aspects of techniques described herein. In some implementations, one or more of a client device, remote system component(s), and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display (e.g., a touch sensitive display), audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods disclosed herein, as well as to implement various components depicted in FIGS. 1 and 2.

These software modules are generally executed by processor 614 alone or in combination with other processors. Memory 625 used in the storage subsystem 624 can include a number of memories including a main random-access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem 612 may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes: receiving user input from a user of a client device; determining, based on processing the user input, that the user input includes: a request to cause an automated assistant to initiate an automated telephone call with an entity; and a task to be performed during the automated telephone call with the entity; prior to causing the automated assistant to initiate the telephone call with the entity: causing a simulation of the automated telephone call with the entity to be performed to simulate the task; determining, based on a result of the simulation, whether to initiate the automated telephone call with the entity or refrain from initiating the automated telephone call with the entity; and in response to determining to initiate the automated telephone call with the entity: causing the automated assistant to initiate the automated telephone call with the entity; and causing the automated assistant to perform the task during the automated telephone call with the entity.

These and other implementations of technology disclosed herein can optionally include one or more of the following features.

In some implementations, the method may further include, in response to determining to refrain from initiating the automated telephone call with the entity: determining, based on the result of the simulation, whether to recommend modifying the task to be performed; and in response to determining to recommend modifying the task: determining one or more modified tasks to be performed and in lieu of the task initially determined based on processing the user input; and causing an indication of one or more of the modified tasks to be provided for presentation to the user via the client device. Each of the one or more modified tasks may modify the entity or one or more corresponding parameters of the task.

In some versions of those implementations, the method may further include, in response to receiving additional user input that selects a given modified task, from among the one or more modified tasks: causing the automated assistant to initiate the automated telephone call; and causing the automated assistant to perform the given modified task during the automated telephone call with the entity or the additional entity.

In additional or alternative versions of those implementations, the method may further include, in response to receiving additional user input that does not select a given modified task, from among the one or more modified tasks, but that includes an indication of an alternative modified task that modifies the task to be performed during the automated telephone call with the entity: causing an additional simulation of the automated telephone call with the entity to be performed to simulate the alternative modified task; and determining, based on an additional result of the additional simulation, whether to initiate the automated telephone call with the entity or refrain from initiating the automated telephone call with the entity.

In additional or alternative versions of those implementations, the method may further include, in response to receiving additional user input that does not select a given modified task, from among the one or more modified tasks, and that indicates a desire to perform the task: causing the automated assistant to initiate the automated telephone call with the entity; and causing the automated assistant to perform the task during the automated telephone call with the entity.

In additional or alternative versions of those implementations, the method may further include, in response to determining to recommend not performing the automated telephone call with the entity: causing an indication of a recommendation to not perform the automated telephone call with the entity to be provided for presentation to the user via the client device.

In some further versions of those implementations, the method may further include, in response to receiving additional user input that indicates a desire to perform the task: causing the automated assistant to initiate the automated telephone call with the entity; and causing the automated assistant to perform the task during the automated telephone call with the entity.

In some implementations, causing the automated assistant to initiate the automated telephone call with the entity may include: obtaining a phone number that is associated with the entity; and causing the automated assistant to utilize the phone number associated with the entity to initiate the automated telephone call with the entity.

In some versions of those implementations, causing the automated assistant to perform the task during the automated telephone call may include: causing the automated assistant to render one or more corresponding instances of synthesized speech at an additional client device associated with a representative of the entity, the one or more corresponding instances of synthesized speech being based on the task to be performed during the automated telephone call; and receiving, from the representative of the entity, one or more corresponding responses that are responsive to one or more of the corresponding instances of the synthesized speech.

In some further versions of those implementations, the method may further include: determining, based on one or more of the corresponding responses that are responsive to one or more of the corresponding instances of the synthesized speech, a result of performance of the task during the automated telephone call; and causing an indication of the result of performance of the task to be provided for presentation to the user via the client device.

In some implementations, causing the simulation of the automated telephone call with the entity to be performed to simulate the task may include: configuring a simulated environment that includes a language model (LM) that emulates the entity; and causing the automated assistant to simulate the task, in the simulated environment, by interacting with the LM that emulates the entity.

In some versions of those implementations, causing the automated assistant to simulate the task, in the simulated environment, by interacting with the LM that emulates the entity may include: causing the automated assistant to render one or more corresponding instances of simulated synthesized speech, the one or more corresponding instances of simulated synthesized speech being based on the task to be performed during the automated telephone call; and receiving, from the LM that emulates the entity, one or more corresponding simulated responses that are responsive to one or more of the corresponding instances of the simulated synthesized speech.

In some further versions of those implementations, the LM that emulates the entity may be prompted with information about the entity to enable the LM to emulate the entity during the simulation.

In additional or alternative further versions of those implementations, the LM that emulates the entity may be fine-tuned, prior to the simulation, based on a corresponding corpus of conversations associated with the entity.

In additional or alternative further versions of those implementations, the method may further include: determining, based on one or more of the corresponding simulated responses that are responsive to one or more of the corresponding instances of the simulated synthesized speech, the result of the simulation.

In yet further versions of those implementations, determining to initiate the automated telephone call with the entity may be based on the result of the simulation indicating that the task is advisable with respect to the entity.

In additional or alternative yet further versions of those implementations, determining to refrain from initiating the automated telephone call with the entity may be based on the result of the simulation indicating that the task is not advisable with respect to the entity.

In additional or alternative versions of those implementations, the simulation may be a local simulation that is performed locally at the client device of the user.

In additional or alternative versions of those implementations, wherein the simulation may be a cloud-based simulation that is performed remotely from the client device of the user.

In some implementations, a method implemented by one or more processors is provided, and includes: receiving user input from a user of a client device; determining, based on processing the user input, that the user input includes: a request to cause an automated assistant to initiate an automated telephone call with an entity; and a task to be performed during the automated telephone call with the entity; prior to causing the automated assistant to initiate the telephone call with the entity: causing a simulation of the automated telephone call with the entity to be performed to simulate the task; determining, based on a result of the simulation, whether to initiate the automated telephone call with the entity or refrain from initiating the automated telephone call with the entity; and in response to determining to refrain from initiating the automated telephone call with the entity: determining, based on the result of the simulation, whether to recommend modifying the task to be performed; and in response to determining to recommend modifying the task: determining one or more modified tasks to be performed and in lieu of the task initially determined based on processing the user input; and causing an indication of one or more of the modified tasks to be provided for presentation to the user via the client device. Each of the one or more modified tasks modify the entity or one or more corresponding parameters of the task.

In some implementations, a method implemented by one or more processors is provided, and includes: receiving user input from a user of a client device; determining, based on processing the user input, that the user input includes: a request to cause an automated assistant to initiate an automated telephone call with an entity; and a task to be performed during the automated telephone call with the entity; prior to causing the automated assistant to initiate the telephone call with the entity: determining, based on the entity and/or the task, whether to cause a simulation of the automated telephone call with the entity to be performed to simulate the task; and in response to determining to cause the simulation of the automated telephone call with the entity to be performed: causing a simulation of the automated telephone call with the entity to be performed to simulate the task; determining, based on a result of the simulation, a next action to be implemented; and causing the next action to be implemented. The next action indicates whether to initiate the automated telephone call with the entity or whether to refrain from initiating the automated telephone call with the entity.

These and other implementations of technology disclosed herein can optionally include one or more of the following features.

In some implementations, the method further includes, in response to determining to not cause the simulation of the automated telephone call with the entity to be performed: refraining from causing the simulation of the automated telephone call with the entity to be performed to simulate the task; causing the automated assistant to initiate the automated telephone call with the entity; and causing the automated assistant to perform the task during the automated telephone call with the entity.

In some implementations, the next action to be implemented may be to initiate the automated telephone call with the entity, and causing the next action to be implemented may include: causing the automated assistant to initiate the automated telephone call with the entity; and causing the automated assistant to perform the task during the automated telephone call with the entity.

In some implementations, the next action to be implemented may be to refrain from initiating the automated telephone call with the entity, and wherein causing the next action to be implemented may include: determining, based on the result of the simulation, whether to recommend modifying the task; and in response to determining to recommend modifying the task: determining one or more modified tasks to be performed and in lieu of the task initially determined based on processing the user input; and causing an indication of one or more of the modified tasks to be provided for presentation to the user via the client device. Each of the one or more modified tasks may modify the entity or one or more corresponding parameters of the task.

In some implementations, determining whether to cause the simulation of the automated telephone call with the entity to be performed to simulate the task based on the entity and/or the task may include: determining, based on an entity type of the entity and/or a task type of the task, whether to cause the simulation of the automated telephone call with the entity to be performed to simulate the task.

In some versions of those implementations, the method may further include, in response to determining that the entity type of the entity corresponds to a first entity type: determining to cause the simulation of the automated telephone call with the entity to be performed to simulate the task.

In some further versions of those implementations, the method may further include, in response to determining that the entity type of the entity corresponds to a second entity type: determining to refrain from causing the simulation of the automated telephone call with the entity to be performed to simulate the task. The second entity type may differ from the first entity type.

In additional or alternative versions of those implementations, the method may further include, in response to determining that the entity type of the entity corresponds to a first entity type, and in response to determining that the task type of the task type corresponds to a first task type: determining to cause the simulation of the automated telephone call with the entity to be performed to simulate the task.

In some further versions of those implementations, the method may further include, in response to determining that the entity type of the entity corresponds to the first entity type, and in response to determining that the task type of the task type corresponds to a second task type: determining to refrain from causing the simulation of the automated telephone call with the entity to be performed to simulate the task. The second task type may differ from the first task type.

In additional or alternative further versions of those implementations, the method may further include, in response to determining that the entity type of the entity corresponds to a second entity type, and in response to determining that the task type of the task type corresponds to the first task type: determining to refrain from causing the simulation of the automated telephone call with the entity to be performed to simulate the task. The second entity type may differ from the first entity type.

In yet further versions of those implementations, the method may further include, in response to determining that the entity type of the entity corresponds to the second entity type, and in response to determining that the task type of the task type corresponds to the second task type: determining to cause the simulation of the automated telephone call with the entity to be performed to simulate the task.

In some implementations, a method implemented by one or more processors is provided, and includes: receiving user input from a user of a client device; determining, based on processing the user input, that the user input includes: a request to cause an automated assistant to initiate an automated telephone call with an entity; and a task to be performed during the automated telephone call with the entity; prior to causing the automated assistant to initiate the telephone call with the entity: determining, based on one or more previously simulated automated telephone calls, whether to causing a simulation of the automated telephone call with the entity to be performed to simulate the task; and in response to determining to cause the simulation of the automated telephone call with the entity to be performed: causing a simulation of the automated telephone call with the entity to be performed to simulate the task; determining, based on a result of the simulation, a next action to be implemented; and causing the next action to be implemented. The next action indicates whether to initiate the automated telephone call with the entity or whether to refrain from initiating the automated telephone call with the entity.

These and other implementations of technology disclosed herein can optionally include one or more of the following features.

In some implementations, determining whether to causing the simulation of the automated telephone call with the entity to be performed to simulate the task based on one or more previously simulated automated telephone calls may include: determining whether a prior automated telephone call was previously simulated with the entity to simulate the task during a prior simulation; and in response to determining that a prior automated telephone call was previously simulated with the entity to simulate the task: determining to refrain from causing the simulation of the automated telephone call with the entity to be performed to simulate the task.

In some versions of those implementations, determining the next action to be implemented based on the result of the simulation may be based on a prior result of the prior simulation.

In some further versions of those implementations, the prior simulation may have been performed based on prior user input received from the user of the client device.

In additional or alternative further versions of those implementations, the prior simulation may have been performed based on prior user input received from an additional user of an additional client device.

In additional or alternative further versions of those implementations, the prior simulation may have been performed based on a database of corresponding conversations between users and the entity.

In additional or alternative versions of those implementations, the method may further include, in response to determining that no prior automated telephone call was previously simulated with the entity to simulate the task: determining to cause the simulation of the automated telephone call with the entity to be performed to simulate the task.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

What is claimed is:

1. A method implemented by one or more processors, the method comprising:
    receiving user input from a user of a client device;
    determining, based on processing the user input, that the user input includes:
        a request to cause an automated assistant to initiate an automated telephone call with an entity; and
        a task to be performed during the automated telephone call with the entity;
    prior to causing the automated assistant to initiate the telephone call with the entity:
        causing a simulation of the automated telephone call with the entity to be performed to simulate the task;
        determining, based on a result of the simulation, whether to initiate the automated telephone call with the entity or refrain from initiating the automated telephone call with the entity; and
    in response to determining to initiate the automated telephone call with the entity:
        causing the automated assistant to initiate the automated telephone call with the entity; and
        causing the automated assistant to perform the task during the automated telephone call with the entity.

2. The method of claim 1, further comprising:
in response to determining to refrain from initiating the automated telephone call with the entity:
    determining, based on the result of the simulation, whether to recommend modifying the task to be performed; and
    in response to determining to recommend modifying the task:
        determining one or more modified tasks to be performed and in lieu of the task initially determined based on processing the user input, wherein each of the one or more modified tasks modify the entity or one or more corresponding parameters of the task; and
        causing an indication of one or more of the modified tasks to be provided for presentation to the user via the client device.

3. The method of claim 2, further comprising:
in response to receiving additional user input that selects a given modified task, from among the one or more modified tasks:
    causing the automated assistant to initiate the automated telephone call; and
    causing the automated assistant to perform the given modified task during the automated telephone call with the entity or an additional entity.

4. The method of claim 2, further comprising:
in response to receiving additional user input that does not select a given modified task, from among the one or more modified tasks, but that includes an indication of an alternative modified task that modifies the task to be performed during the automated telephone call with the entity:
    causing an additional simulation of the automated telephone call with the entity to be performed to simulate the alternative modified task; and
    determining, based on an additional result of the additional simulation, whether to initiate the automated telephone call with the entity or refrain from initiating the automated telephone call with the entity.

5. The method of claim 2, further comprising:
in response to receiving additional user input that does not select a given modified task, from among the one or more modified tasks, and that indicates a desire to perform the task:
    causing the automated assistant to initiate the automated telephone call with the entity; and
    causing the automated assistant to perform the task during the automated telephone call with the entity.

6. The method of claim 2, further comprising:
in response to determining to recommend not performing the automated telephone call with the entity:
    causing an indication of a recommendation to not perform the automated telephone call with the entity to be provided for presentation to the user via the client device.

7. The method of claim 6, further comprising:
in response to receiving additional user input that indicates a desire to perform the task:
    causing the automated assistant to initiate the automated telephone call with the entity; and
    causing the automated assistant to perform the task during the automated telephone call with the entity.

8. The method of claim 1, wherein causing the automated assistant to initiate the automated telephone call with the entity comprises:
obtaining a phone number that is associated with the entity; and
causing the automated assistant to utilize the phone number associated with the entity to initiate the automated telephone call with the entity.

9. The method of claim 8, wherein causing the automated assistant to perform the task during the automated telephone call comprises:
causing the automated assistant to render one or more corresponding instances of synthesized speech at an additional client device associated with a representative of the entity, the one or more corresponding instances of synthesized speech being based on the task to be performed during the automated telephone call; and
receiving, from the representative of the entity, one or more corresponding responses that are responsive to one or more of the corresponding instances of the synthesized speech.

10. The method of claim 9, further comprising:
determining, based on one or more of the corresponding responses that are responsive to one or more of the corresponding instances of the synthesized speech, a result of performance of the task during the automated telephone call; and
causing an indication of the result of performance of the task to be provided for presentation to the user via the client device.

11. The method of claim 1, wherein causing the simulation of the automated telephone call with the entity to be performed to simulate the task comprises:
configuring a simulated environment that includes a language model (LM) that emulates the entity; and
causing the automated assistant to simulate the task, in the simulated environment, by interacting with the LM that emulates the entity.

12. The method of claim 11, wherein causing the automated assistant to simulate the task, in the simulated environment, by interacting with the LM that emulates the entity comprises:
causing the automated assistant to render one or more corresponding instances of simulated synthesized speech, the one or more corresponding instances of simulated synthesized speech being based on the task to be performed during the automated telephone call; and
receiving, from the LM that emulates the entity, one or more corresponding simulated responses that are responsive to one or more of the corresponding instances of the simulated synthesized speech.

13. The method of claim 12, wherein the LM that emulates the entity is prompted with information about the entity to enable the LM to emulate the entity during the simulation.

14. The method of claim 12, wherein the LM that emulates the entity is fine-tuned, prior to the simulation, based on a corresponding corpus of conversations associated with the entity.

15. The method of claim 12, further comprising:
determining, based on one or more of the corresponding simulated responses that are responsive to one or more of the corresponding instances of the simulated synthesized speech, the result of the simulation.

16. The method of claim 15, wherein determining to initiate the automated telephone call with the entity is based on the result of the simulation indicating that the task is advisable with respect to the entity.

17. The method of claim 15, wherein determining to refrain from initiating the automated telephone call with the entity is based on the result of the simulation indicating that the task is not advisable with respect to the entity.

18. The method of claim 11, wherein the simulation is a local simulation that is performed locally at the client device of the user, or wherein the simulation is a cloud-based simulation that is performed remotely from the client device of the user.

19. A method implemented by one or more processors, the method comprising:
receiving user input from a user of a client device;
determining, based on processing the user input, that the user input includes:
a request to cause an automated assistant to initiate an automated telephone call with an entity; and
a task to be performed during the automated telephone call with the entity;
prior to causing the automated assistant to initiate the telephone call with the entity:
causing a simulation of the automated telephone call with the entity to be performed to simulate the task;
determining, based on a result of the simulation, whether to initiate the automated telephone call with the entity or refrain from initiating the automated telephone call with the entity; and
in response to determining to refrain from initiating the automated telephone call with the entity:
determining, based on the result of the simulation, whether to recommend modifying the task to be performed; and
in response to determining to recommend modifying the task:
determining one or more modified tasks to be performed and in lieu of the task initially determined based on processing the user input, wherein each of the one or more modified tasks modify the entity or one or more corresponding parameters of the task; and
causing an indication of one or more of the modified tasks to be provided for presentation to the user via the client device.

20. A system comprising:
one or more hardware processors; and
memory storing instructions that, when executed by the one or more hardware processors, cause the one or more hardware processors to be operable to:
receive user input from a user of a client device;
determine, based on processing the user input, that the user input includes:
a request to cause an automated assistant to initiate an automated telephone call with an entity; and
a task to be performed during the automated telephone call with the entity;
prior to causing the automated assistant to initiate the telephone call with the entity:
cause a simulation of the automated telephone call with the entity to be performed to simulate the task;
determine, based on a result of the simulation, whether to initiate the automated telephone call with the entity or refrain from initiating the automated telephone call with the entity; and
in response to determining to refrain from initiating the automated telephone call with the entity:

determine, based on the result of the simulation, whether to recommend modifying the task to be performed; and in response to determining to recommend modifying the task:
- determine one or more modified tasks to be performed and in lieu of the task initially determined based on processing the user input, wherein each of the one or more modified tasks modify the entity or one or more corresponding parameters of the task; and
- cause an indication of one or more of the modified tasks to be provided for presentation to the user via the client device.

\* \* \* \* \*